Dec. 22, 1925.  1,566,348
S. W. SHUFORD
WEIGHING MECHANISM
Filed April 13, 1923   6 Sheets-Sheet 1

Inventor:
S. W SHUFORD,
By W. T. Fitz Gerald & Co.
Attorney.

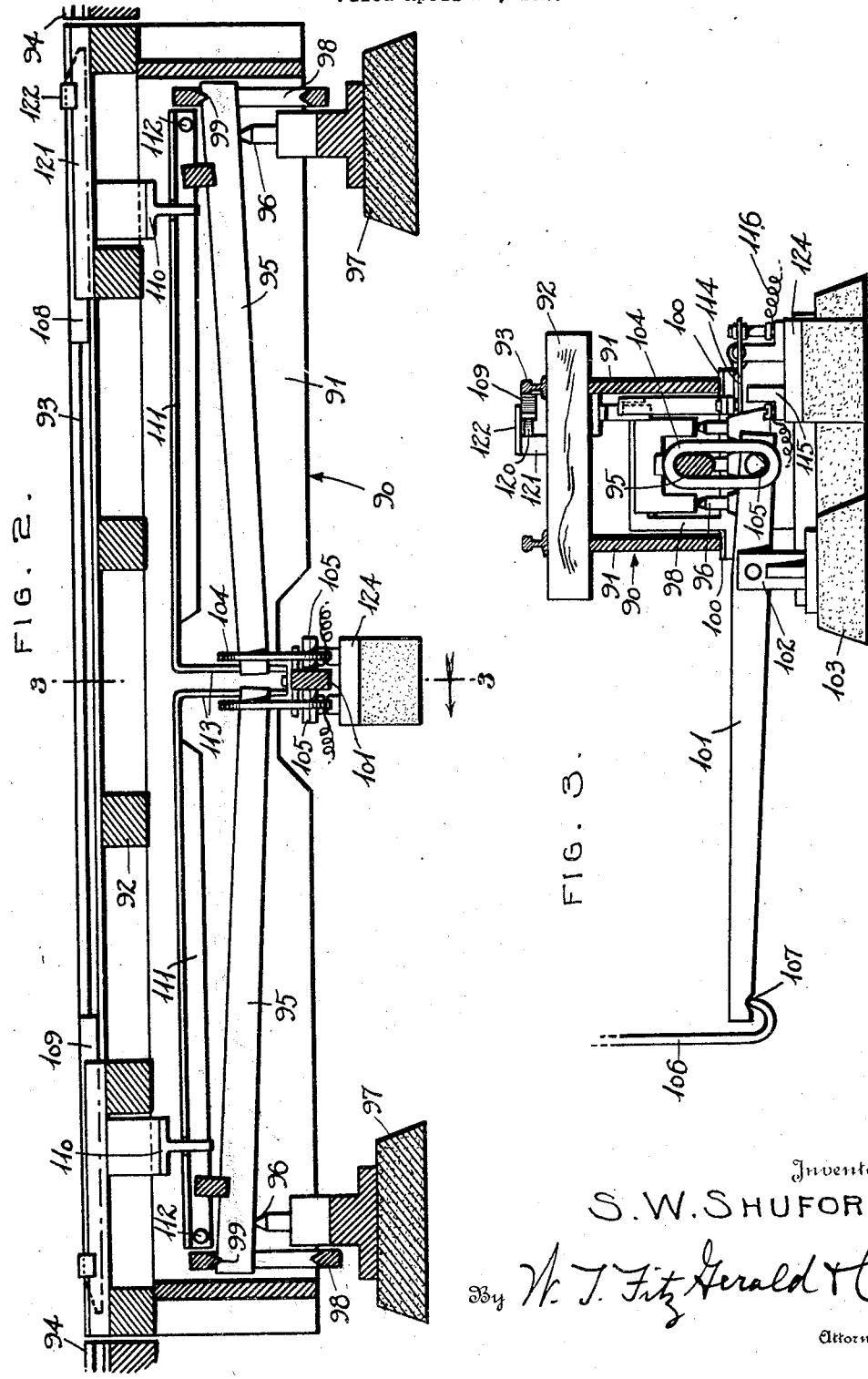

Dec. 22, 1925.  
S. W. SHUFORD  
WEIGHING MECHANISM  
Filed April 13, 1923  
1,566,348  
6 Sheets-Sheet 3

Inventor:  
S. W. SHUFORD,  
By W. J. FitzGerald & Co.  
Attorney.

Dec. 22, 1925.  
S. W. SHUFORD  
WEIGHING MECHANISM  
Filed April 13, 1923  
1,566,348  
6 Sheets-Sheet 5

Inventor:
S. W. SHUFORD,
By W. J. Fitz Gerald & Co.
Attorney.

Patented Dec. 22, 1925.

1,566,348

UNITED STATES PATENT OFFICE.

STEPHEN W. SHUFORD, OF COWPENS, SOUTH CAROLINA.

WEIGHING MECHANISM.

Application filed April 13, 1923. Serial No. 631,841.

*To all whom it may concern:*

Be it known that I, STEPHEN W. SHUFORD, a citizen of the United States, residing at Cowpens, in the county of Spartanburg and State of South Carolina, have invented certain new and useful Improvements in a Weighing Mechanism; and I do hereby declare the following to be a full, clear, and exact description of the invention, such as will enable others skilled in the art to which it appertains to make and use the same.

The present invention relates to scales and weighing mechanisms, and is particularly an improvement over the weighing mechanisms disclosed in my Patents Nos. 1,422,-141 and 1,452,763, granted July 11, 1922 and April 24, 1923, respectively.

The invention has for its primary object the provision of a novel and improved apparatus for automatically weighing and recording the weights of successive objects passing over a part of the apparatus, such as a train of cars, and including novel devices for carrying out the intended functions.

Another object is the provision of novel means for making the imprint or record at the proper time as each of the successive cars or objects moves onto the platform or support; and a further object, in this connection, is to provide such means which will be automatically effective for cars or objects moving in either direction.

It is also the object of the invention to improve the mechanism generally in its construction and details to enhance the utility and efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Fig. 2 is a longitudinal section on the line 2—2 of Fig. 1 of the platform construction.

Fig. 3 is a cross section on the line 3—3 of Fig. 2.

Figure 1:
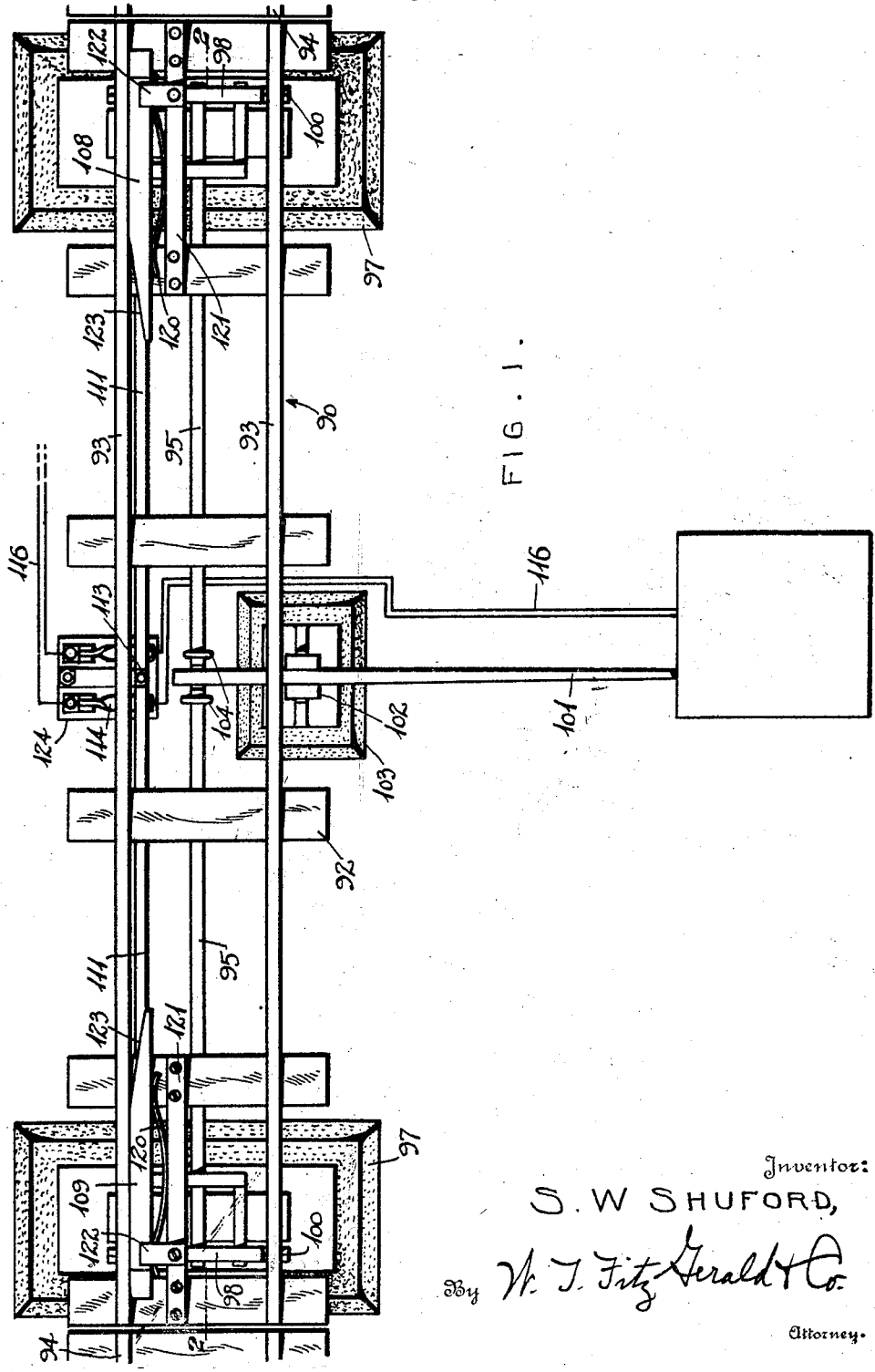
Figure 1 is a plan view of the apparatus, showing the recording device enclosed in a casing.
Figure 4:
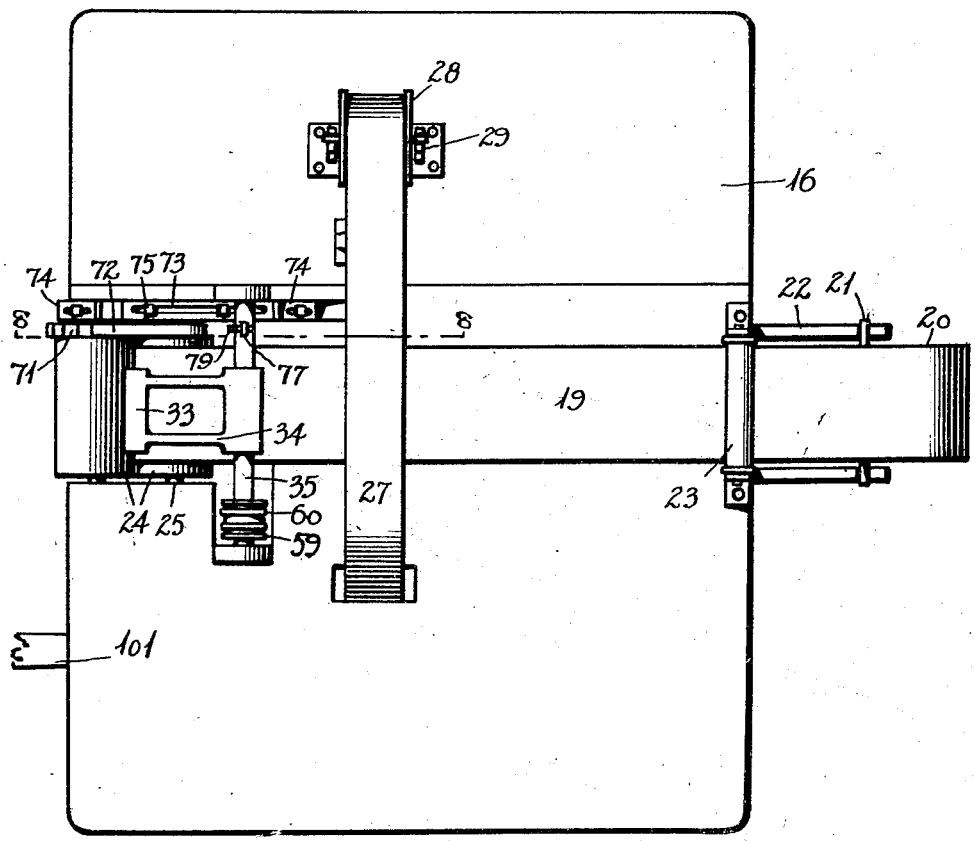
Fig. 4 is a plan view of the recording device.

The recording device, which is enclosed within a suitable casing, comprises a frame 14 mounted on a suitable foundation 15 at one side of the railroad track, and although the mechanism is shown as constructed and arranged for weighing railroad cars, it may be adapted and used for weighing other objects. The frame 14 has the table top 16, and a set of printing or recording wheels 17 is mounted under the top 16 and have numerical type thereon. Said wheels are mounted for rotation, as at 18, with their upper portions disposed within an opening in the top 16, and the wheels or units 17 are geared together in any well known manner so that the second wheel is rotated one step for each complete rotation of the first wheel, while the third wheel is rotated one step for each complete revolution of the second wheel. The operative connections between said wheels or units may be the same as between the wheels or dials of recorders and registers, as well known.

The records are kept on a tape or strip 19 of paper or other suitable material which passes across the top 16 and over the printing wheels or device 17 from a roll 20 mounted for rotation on the rod 21 seated in supporting brackets 22 carried by the frame. The tape 19 passes from the roll 20 under a guide roller 23 mounted on the top 16 adjacent to the roll 20, and from the guide roller 23, the tape 19 passes over the printing wheels 17 and then down between a pair of feed rollers 24 located at that side of the recording device opposite to the roll 20. The axles 25 of the rollers 24 are disposed in downwardly converging slots 26 in the frame 14, whereby the rollers 24 in moving downwardly by gravity, will be moved toward one another for gripping the tape 19 between them, so as to advance the tape when the rollers are rotated.

An inked ribbon 27 extends across the tape 19 for obtaining the impressions on the tape, and said ribbon is wound on the spools 28 and 30, the spool 28 being removably supported in brackets 29 on the top 16 at one side of the tape 19, and the spool 30 being secured on a shaft 31 mounted for rotation in the brackets 32 of the frame 14 under the top 16 at the opposite side of said tape 19.

The printing is done by a platen 33 carried by an arm 34 secured to a rock shaft 35 mounted on the top 16 of the frame across the tape 19, so that when the arm 34 is swung into operative position, the platen 33 presses the ribbon 27 down on the tape 19 over the uppermost type of the wheels 17, to make the impression on the upper surface of the tape.

The actuating device for setting the printing wheels 17 includes a pinion 36 secured to the first wheel 17, and meshing with a gear wheel 37 secured to a rock shaft 38 mounted in roller bearings 39 in the frame 14. An arm 40 is secured to the shaft 38, and a vertical link 41 has its upper end connected to the arm 40, whereby the link 41 in being pulled downwardly will swing the arm 40 so that the gear wheel 37 and pinion 36 will advance the wheels 17 accordingly, said wheels being returned to zero position when the link 41 is again raised to initial position.

The counter-poise device includes a pair of drums 42 at opposite sides of the link 41 having the bolts 43 extending through the centers thereof, and rockers 44 are secured to the ends of the bolts 43. Said rockers 44 have the downwardly extending knife-edge fulcrums 45 below the centers of the drums 42 seating on the seats 46, whereby the drums 42 have a combined rotary and rocking motion, it being noted that said drums turn about the axes below the axes of the drums themselves. A strap 47 has its end portions passing over the drums 42, with the terminals of said strap secured to the drums in any suitable manner, and the intermediate portion of the strap is looped downward between the drums and passes under a roller 48 mounted on a bolt or axle 49 engaged in the link 41, a nut 50 being threaded on the bolt 49 for clamping the roller 48 against rotation, if desired, but the roller is preferably left loose for rotation so as to equalize the action of the counter-poise weights. The roller 48 is thus slung in the depending loop of the strap 47, so that when the link 41 is moved downwardly, the intermediate portion of the strap 47 is moved downwardly with the roller 48, thereby turning and rocking the drums 42 toward one another.

Figure 5:
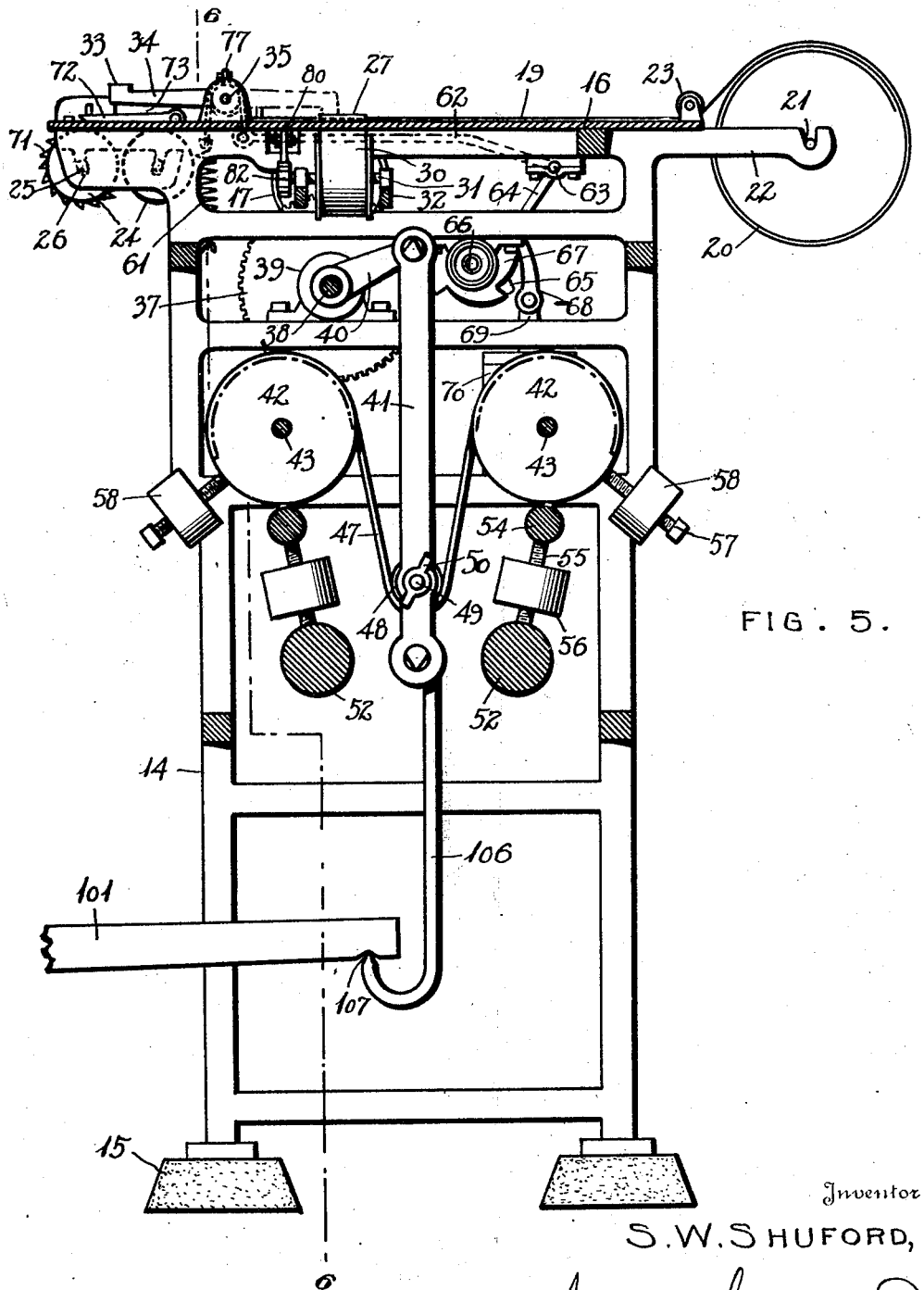
Fig. 5 is a vertical section of the recording device taken on the line 5—5 of Fig. 6.
Figure 6:
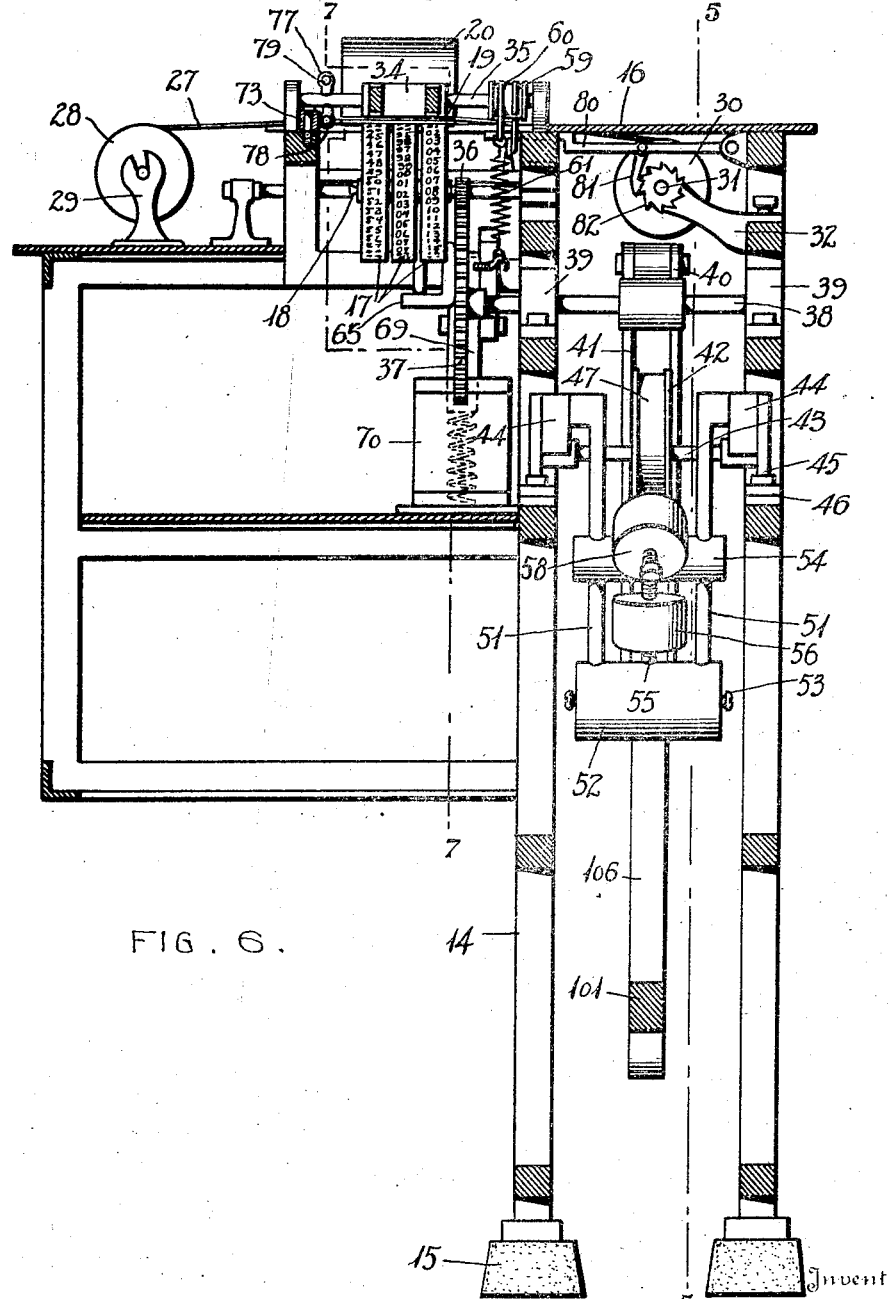
Fig. 6 is a vertical section of said device taken on the line 6—6 of Fig. 5.
Figure 7:
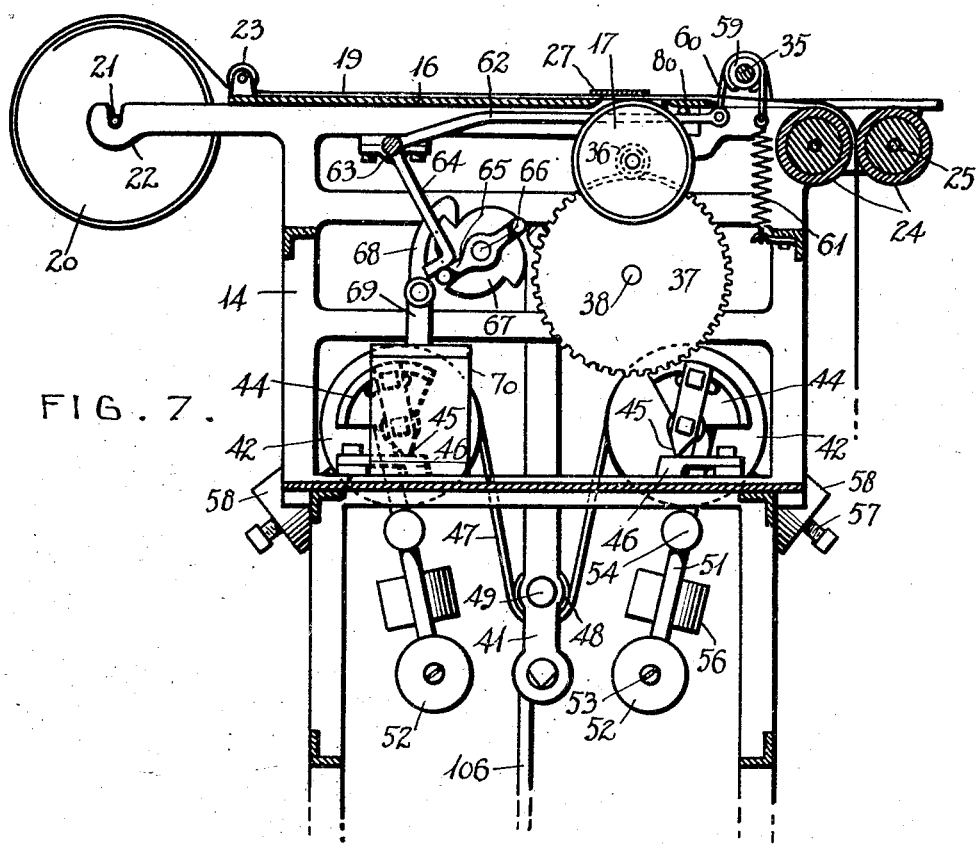
Fig. 7 is a vertical section of said device taken on the line 7—7 of Fig. 6.

Counter-poise weights are carried by the drums 42 for moving said drums away from one another, to raise the link 41 and return the wheels 17 to zero position when no weight is imposed on the mechanism. Thus, a pair of pendulums 51 is secured to the end members 44 of each drum 42, and a weight 52 is fitted slidably on said pendulums and is held in adjusted position by means of set screws 53. A second weight 54 is slidable on the pendulums 51 and is connected to the weight 52 by means of a screw 55 between the pendulums. A third weight 56 is threaded on the screw 55 to be adjusted toward and away from the drum 42 by rotating said weight 56. In the initial position of the drums 42, the pendulums 51 are swung toward one another beyond the vertical planes of the axes of oscillation, and this is accomplished by the weights 58 mounted on screws 57 secured to the drums 42 and extending downwardly and outwardly, as seen in Fig. 5. The weights 58, similar to the weights 56, can be adjusted toward and away from the drums by rotating said weights, whereby the counter-poise weights can be adjusted so that the wheels 17 are set properly according to the weight imposed on the link 41. When the counter-poise device is in equilibrium, with the wheels 17 at zero, the weights 58 will turn the drums 42 away from one another so that the pendulums 51 and weights carried thereby will be swung toward one another beyond the vertical planes of the axes of oscillation. Then, as the link 41 is moved downwardly under the weight imposed thereon, the drums 42 are turned toward one another, thereby raising the weights 58 and the pendulums 51 will move past vertical positions and then start to move upwardly, so that the counter-poise weights will provide a gradually increasing resistance to the downward movement of the link 41.

The actuating means for the rock shaft includes a drum 59 secured on said shaft and having flexible elements 60 secured and wound thereon, the spring 61 being secured to one element 60 for turning the drum 59 and shaft 35 to swing the platen arm 34 to idle position away from the ribbon 27. The other element 60 is connected to the end of a long arm 62 of a lever mounted in the frame 14 below the top 16, said arm 62 being secured to a shaft 63 mounted for oscillation in the frame, and the second arm 64 of the lever also being secured to said shaft. The arm 64 is disposed in the path of tappets 65 carried by a shaft 66 mounted in the frame 14, whereby the rotation of said shaft and the wiping action of the tappets past the end of the arm 64, will swing the arm 62 downwardly to turn the drum 59 and shaft 35 so as to swing the arm 34 to operative position. A ratchet wheel 67 is secured on the shaft 66 and is engaged by a pawl 68 pivoted to the core 69 of a solenoid 70, whereby the solenoid being energized to attract the core 69 will turn the ratchet wheel 67 and shaft 66 one step. In using the mechanism for weighing railroad cars, the pawl and ratchet connection as shown requires the solenoid 70 to be energized twice in succession for operating the platen 33 once. Thus, the ratchet wheel 67 must be advanced two steps so that a tappet 65 will swing the arm 64. This arrangement is provided in order that the impression will be made only after both trucks of the car have moved onto the platform, as will hereinafter more fully appear.

Figure 8:
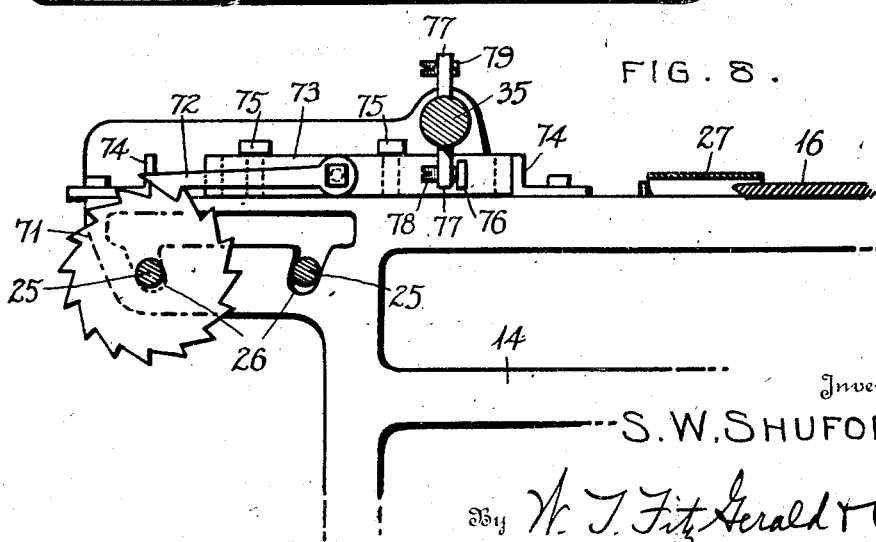
Fig. 8 is an enlarged detail view of the actuating means for advancing the tape or strip on which the records are made.

The rocking motion of the shaft 35 is used for advancing the tape 19 one step after each impression is made thereon. Thus, a ratchet wheel 71 is secured to one of the axles 25 of the feed rollers 24, and is engaged by a pawl 72 pivoted to a reciprocatory slide 73 mounted for sliding motion on the frame 14 at one side of the tape 19. The movement of the slide 73 is limited by means of adjustable stops 74 beyond the ends of said slide, and the slide is slotted and is retained in operative position on the frame by means of headed studs 75 carried by the frame and extending through the slot of the slide. The slide 73 has an outstanding lug 76 to be alternately engaged by the contact screws 78 and 79 which are threaded in opposite lugs 77 carried by the shaft 35. Thus, when the shaft 35 is turned to bring the platen 33 against the ribbon 37, the screw 79 is moved downwardly to strike the stud 76 and move the slide 73 (toward the left as seen in Fig. 8), thereby engaging the pawl 72 with the next tooth of the ratchet wheel 71. When the shaft 35 is turned backwardly to return the platen 33 to normal position, the screw 78 is moved downwardly against the stud 76, thereby moving the slide 73 in the opposite direction, so that the pawl 72 advances the ratchet wheel 71 one step, thereby turning the rollers 24 to advance the tape 19 one step. By adjusting the screws 78 and 79 and the stops 74, the movement of the slide 73 can be increased to advance the ratchet wheel 71 two steps at a time, when a double step of the tape 19 is desired.

The ribbon 27 is also advanced step by step so as to present new inked surfaces to the tape 19. Thus, a lever 80 is fulcrumed under the top 16 and extends over the arm 62, and has a pawl 81 engaging a ratchet wheel 82 secured to the shaft 31 of the ribbon spool 30. Thus, when the arm 62 is swung downwardly to move the platen 33 to printing position, the lever 80 will gavitate, and when the arm 62 is again raised, the lever 80 is raised so that the pawl 81 advances the ratchet wheel 82 and spool 30 one step.

The railroad platform comprises a platform frame 90 having the side plates 91 on which the ties 92 are mounted, which support the rail sections 93 of the platform. The platform is of a length to accommodate one car, and the rail sections 93 of the platform aline and register with the rails 94 of the track.

The platform is mounted for yielding motion and is operatively connected with the link 41 of the recording device so that the printing wheels 17 are advanced according to the weight of the car on the platform. A pair of levers 95 is disposed between the side plates or walls 91 of the platform and are fulcrumed near their opposite ends on the fulcrums 96 mounted on suitable bases on foundations 97, and bearing yokes 98 have knife-edges 99 seating on the opposite short arms of the levers 95, and have opposite knife-edges 100 on which the platform frame 90 seats, so that the weight of the platform will depress the opposite short arms of the levers 95 to raise the adjacent long arms thereof.

A lever 101 extends transversely to one side from under the platform 90 and is fulcrumed, as at 102, on the base or foundation 103. The lever 101 has a short arm extending under the adjacent ends of the levers 95, and stirrups 104 engage over the levers 95 and under the knife-edge bearings 105 of the short arm of the lever 101. The long arm of the lever 101 projects into the frame 14 of the recording device, and said lever 101 is connected with the link 41 by the link 106 which preferably has knife-edge bearings 107 with the lever 101 and link 41. The depression of the platform will raise the long arms of the levers 95, so that the stirrups 104 swing the short arm of the lever 101 upwardly and the long arm of the lever 101 downwardly, thereby pulling the link 41 downwardly with the link 106, to set the printing wheels 17 according to the weight imposed on the platform, the counter-poise device obtaining the proper balance with the car or object on the platform. The motion is also increased whereby the link 41 has a comparatively large vertical movement in comparison with the depression of the platform.

The printing of the record is accomplished when the car has moved onto the platform by means of tread members 108 and 109 disposed at the inner sides of either rail section 93, to be depressed by the flanges of the car wheels. Said tread members are movable vertically so as to be depressed by the wheels, and are also movable away from the rail section for the passage of the wheel flanges between said members and rail section. Said members have downwardly extending portions 110 engaging the levers 111 fulcrumed, as at 112, to the frame 90 at opposite ends, and the adjacent ends of said levers have downwardly extending portions 113 seating or secured on an electric switch having the switch blades 114 to be depressed into engagement with the contacts 115 for closing the electric circuit 116 of the solenoid 70. The circuit is supplied with electrical energy from a battery or other suitable source, and when either lever 111 is depressed, the switch blades 114 are moved into engagement with the contacts 115, thereby closing the circuit and energizing the solenoid 70 to attract the core 69 and advance the ratchet wheel 67 and shaft 66 one step. The switch is mounted on a suitable base or foundation 124.

In order that only the tread member at the entrance end of the platform will be depressed by the wheels of the cars moving over the platform in the corresponding direction, those ends of the tread members nearest the center of the platform are cut obliquely to form the cams 123 whereby the flanges of the wheels moving toward the exit end of the platform will, in engaging the cam 123 of the tread member at the exit end of the platform, shift the tread member laterally away from the rail, the wheel flanges moving between the rail and tread member, without depressing the tread member. The tread members are yieldingly moved against the corresponding rail section 93 by the bowed springs 120 disposed between the tread members and bars 121 secured on the ties 92, and stops 122 are secured on the bars 121 and project over the tread members near their opposite or outer ends. Said stops prevent the outer ends of the tread members from being tilted upwardly.

The operation of the mechanism is as follows: Supposing that the train is moving from the right to the left as seen in Figs. 1 and 2, then the tread member 108 will be operable for controlling the printing, and the tread member 109 will be inoperative. When the first truck of each car passes onto the platform it will depress the tread member 108 and corresponding switch-operating lever 111, to close the circuit of the solenoid 70, thereby advancing the ratchet wheel 67 and tappets 65 one step. When the truck has moved toward the center of the platform, the tread member 108 is raised by the spring which opens the switch, thereby opening the circuit of the solenoid 70 so that the pawl 68 is raised by the spring of the core 69, to engage the next tooth of the ratchet wheel 67. Then, when the other truck of the car passes on the platform and over the tread member 108, the tread member and corresponding lever 111 are again depressed, to close the circuit of the solenoid 70 when the complete weight of the car has been imposed on the platform. The depression of the platform, will through the operative connection, draw the link 41 downwardly a distance proportional to the weight of the car, thereby setting the printing wheels 17 accordingly. The second depression of the tread member 108 will also cause the record to be made, inasmuch as the second step of the ratchet wheel 67 will cause the corresponding tappet 65 to swing the arm 64 and cause the platen 33 to make the impression. When the tread member 108 is again released, so that the circuit of the solenoid 70 is again opened, the pawl 68 is restored for a subsequent operation, and the shaft 35 having been restored by the spring 61 will return the platen 33 to normal position. At the same time, the arm 80 being raised by the arm 62 will advance the ribbon 27 one step, and the return movement of the shaft 35 will operate the slide 73 for advancing the tape 19 one step preparatory for the next impression. In this manner, the impression or record is not made until both trucks of the car have moved onto the platform, the depression of the tread member by the first truck advancing the actuating device part way and the depression of the tread member the second time by the other truck causing the recording device to operate for making the impression on the tape 19.

When the wheels pass the tread member 109, the flanges of the wheels contacting with the cam 123 of the tread member 109, will shift said tread member laterally inward away from the rail, without depressing said tread member, so that the solenoid 70 will not be energized as the wheels pass the second tread member in leaving the platform. In this manner, the tread member at the entrance end of the platform is operative while the tread member at the exit end of the platform is inoperative, and this applies to the motion of the train in either direction over the platform. Thus, when the cars move from the left to the right in Figs. 1 and 2, the tread member 109 will be depressed by the wheel flanges, while the tread member 108 will be shifted away from the rail without being depressed. The making of the impressions is therefore automatically taken care of when the cars move over the platform in either direction.

Having thus described the invention, what is claimed as new is:—

1. A weighing mechanism embodying a yieldable platform, a recording device, means whereby said device is operatively connected to the platform to be set by the depression thereof, members mounted near the opposite ends of the platform and each arranged to be moved in one direction by cars moving on the platform and to be moved in another direction by cars moving off the platform, and means arranged to be operated by either of said members, when it is moved in the first-named direction, for operating said device to make a record.

2. A weighing mechanism embodying a yieldable platform, a recording device, means whereby said device is operatively connected to said platform to be set by the depression thereof, and mechanism operatively connected with said device for operating same to make a record and including car operated means located at opposite ends of the platform, each of the last named means being arranged to be operated by cars when moving on the platform at the corresponding end thereof to actuate said mechanism for operating said device, and being arranged so as not to be so operated when the cars move off the platform at the corresponding end thereof.

3. A weighing mechanism embodying a yieldable platform, a recording device, means whereby said device is operatively connected to the platform to be set by the depression thereof, tread members on the platform near the opposite ends thereof arranged to be operated by the wheels of the cars moving over the platform, each of said members being arranged to be moved in one direction by the wheels passing on the platform and to be moved in another direction by the wheels moving off the platform, and means arranged to be operated by either of said tread members, when it is moved in the firstnamed direction, for operating said device to make a record.

4. A weighing apparatus embodying a yieldable platform, a recording device, means whereby said device is operatively connected to the platform to be set by the depression thereof, tread members on the platform near the opposite ends thereof arranged to be depressed by the wheels of cars moving on the platform, and means operated by the depression of said members for operating said device to make a record, said tread members having cams for the engagement of the wheels when passing from the platform to shift the tread members without depressing them.

5. A weighing mechanism embodying a yieldable platform, a recording device operatively connected to the platform to be set by the depression thereof, tread members on the platform near the opposite ends thereof and mounted for depression and for lateral shifting motion, said members being adapted to be depressed by the wheels of cars moving on the platform, and means controlled by the depression of said tread members for operating said device to obtain a record, said tread members having cams at their inner ends for the contact of the wheels to shift the tread members transversely as the wheels move from the platform, in either direction, without depressing the tread members.

6. A weighing mechanism embodying a yieldable platform, a recording device, means whereby said device is operatively connected to the platform to be set by the depression thereof, an electrical device operatively connected with the recording device for making a record, members on the platform near the opposite ends thereof and arranged to be operated in one direction only by cars moving onto the platform at the entrance end of the platform with the cars moving in either direction, and means controlling the circuit of said electric device by the movement of the member at the entrance end of the platform according to the direction of travel of the cars.

In testimony whereof I have signed my name to this specification.

S. W. SHUFORD.